United States Patent [19]
Cyr

[11] Patent Number: 5,362,397
[45] Date of Patent: Nov. 8, 1994

[54] METHOD FOR THE BIODEGRADATION OF ORGANIC CONTAMINANTS IN A MASS OF PARTICULATE SOLIDS

[75] Inventor: Benoit Cyr, Neufchatel, Canada
[73] Assignee: Biogenie Inc., Quebec, Canada
[21] Appl. No.: 71,366
[22] Filed: May 18, 1993

Related U.S. Application Data

[63] Continuation of Ser. No. 710,206, Jun. 5, 1991, abandoned.

[51] Int. Cl.$^5$ ............................................. C02F 3/04
[52] U.S. Cl. .................... 210/610; 210/617; 210/621; 210/631; 210/909; 210/747
[58] Field of Search ............... 210/610, 611, 617, 621, 210/622, 631, 747, 908, 909, 922, 603, 614, 742; 405/128

[56] References Cited

U.S. PATENT DOCUMENTS

| | | | |
|---|---|---|---|
| 4,349,633 | 9/1982 | Worne et al. | 435/281 |
| 4,849,360 | 7/1989 | Norris et al. | 435/264 |
| 4,850,745 | 7/1989 | Hater et al. | 405/258 |
| 4,952,315 | 8/1990 | Saab | 210/610 |
| 5,017,289 | 5/1991 | Ely et al. | 210/610 |
| 5,039,415 | 8/1991 | Smith | 210/747 |

OTHER PUBLICATIONS

Thayer Bioremediation: Innovative Technology, Etc., C&N Prod.Rpt., Aug. 26, 1991, pp. 23-44.
Fohy et al. Mighty Microbes, Chem. Eng., Mar. 1991, pp. 30-35.
Glass Overview of Approaches to Biological, Etc., Environmental Expo, May 21-23, 1991, pp. 1-5.
Labrie et al. Biological Remediation of Shoreline, Etc., Techn. Seminar-Environment Canada, Jun. 6-8, 1990, pp. 389-399.
Compostage et Regeneration Des Sols, Biodegradation No. 151, pp. 347-350.

*Primary Examiner*—Thomas Wyse
*Attorney, Agent, or Firm*—Foley & Lardner

[57] ABSTRACT

A method for the biodegradation of organic contaminants in a mass of particulate solids. The method comprises providing a contaminated mass of particulate solids on an impervious surface in fluid communication with an impervious recovery reservoir. The impervious surface has operating thereon air supply and/or air suction means to provide suitable and continuous oxygenation of the mass and/or to remove undesirable vapor emissions from the mass. The mass is periodically irrigated by applying on its surface a culture medium comprising at least one bacterial strain and co-substrates thereof. The bacterial strain has the ability to degrade the organic contaminants. The medium is drained through the mass and washings recovered in the reservoir to be reused to irrigate the mass. The mass is periodically mixed and its temperature and moisture level are controlled to monitor the biological activity of the bacterial strain and to maintain the activity at levels suitable for the bacterial strain to degrade the contaminants in the mass.

19 Claims, 7 Drawing Sheets

METHOD FOR THE BIODEGRADATION OF ORGANIC CONTAMINANTS IN A MASS OF PARTICULATE SOLIDS

This application is a continuation of application Ser. No. 07/710,206, filed Jun. 5, 1991, abandoned.

FIELD OF THE INVENTION

The invention relates broadly to the degradation of organic contaminants present in particulate solids. More particularly, the invention relates to the degradation of organic contaminants in soils through microbiological processes.

BACKGROUND OF THE INVENTION

Bioremediation is the use of living organisms for detoxication of hazardous wastes. It can involve either the introduction of specific organisms and/or the stimulation of indigenous bacteria. The technique was first experimented in the 1970's to treat contaminated soils and aquifers. However, hurdles in the regulatory processes and constant pressure from environmentalist groups had reduced the use of bioremediation to marginal levels.

In recent years however, several advantages have been recognized for bioremediation, particularly in situ bioremediation. Among others, it has been found that the technology is specific, relatively cheap and quicker to use than most other remediation techniques. The technique can be used to degrade a wide variety of organic compounds present at various levels in contaminated soils. One of the most important advantages of biological degradation over conventional techniques is the fact that the contaminants are usually broken down to harmless substances whereas conventional techniques usually only temporary displace the problem or transfer the contaminants to another medium.

Various approaches to bioremediation of soils have been tested and compared. One preliminary conclusion that seems to be drawn from those tests is that microorganisms occurring in nature are so versatile and so adaptable that most applications of bioremediation could rely almost exclusively on the use of natural organisms that have not been modified in any way, thereby avoiding, at least for now, the introduction in natural systems of genetically engineered organisms.

The most common technique used in bioremediation involves the stimulation of naturally occurring bacteria residing at the site of contamination. It is usually called "biostimulation". By addition of the appropriate nutrients, principally oxygen, phosphorus and nitrogen, and by maintaining optimum growth conditions, it is possible in some instances to favour increased multiplication of the communities of indigenous organisms that together are capable of degrading undesirable contaminants. Hence, the addition of microorganisms to the site is not required in biostimulation. A common variation of the "biostimulation" technique is land-farming. In land-farming, chemical nutrients are added to soil, often in an excavated pile, while adequate oxygenation is assured by frequent turning or dishing of the soil.

Implementing biostimulation usually requires a certain amount of laboratory testing, to ensure that there are sufficient numbers of indigenous microbes on site, and to determine the optimum conditions to enhance their growth and biodegradative action. This preliminary characterization usually leads to treatability studies to establish that the site can be remediated economically. In situ bioremediation usually requires extensive engineering to introduce nutrients to the site, through injection wells, infiltration galleries and the like. Land-farming, in contrast, can be accomplished simply by spraying the nutrients onto soil piles that are frequently mixed and aerated.

In U.S. Pat. No. 4,849,360, Norris et al. describe a process using biostimulation for confining contaminated soils and degrading the hydrocarbons they contain. The method comprises the use of indigenous microorganisms, nutrients, water and a suitable gas distribution system. The amount of contaminated soils to be treated is adjusted by evaluating the capacity of the gas distribution system to create optimal aerobic conditions (see column 2, lines 47–50). The method also involves evaluating the native microbial community in the soil and creating proper conditions for this community to grow as much as possible (see column 4, lines 12–45). One of the major drawbacks of this method appears to be the fact that the soils to be decontaminated must be confined in a container.

Another example of a decontamination system using biostimulation is described in the March 1991 issue of Chemical Engineering in an article entitled "Mighty Microbes". For this system, liquids are sprayed on the contaminated soil pile, and air may be blown or suctioned through the mass by a system of pipes located under the mass. This is described as a "wet" technique for the onsite processing of soil. Contrary to the technique described in U.S. Pat. No. 4,849,360, soil is not confined to a container. The sprinkling system is used to add water and nutrients and the air distribution system buried in the pile increases oxygen supply. Although the method has proven to be quite interesting for the degradation of some contaminants, it has been found to be relatively time consuming and somewhat limited for degrading more chemically stable contaminants such as PCB's. As shown at page 33 of the article, decontamination of a contaminated soil containing PCP and creosote led to a 58% reduction in contaminants in 3 months. Generally, this is not sufficient to meet the levels required by the regulatory authorities in North America.

An alternative to biostimulation is "bioaugmentation". This technique consists in introducing non-native cultures, previously selected from other sites for their ability to degrade specific wastes. These microbial products are usually blends of different species or strains. In recent years, companies have begun selling microbial blends purported to be active against hazardous compounds, including use for in situ waste remediation. Most common are products for degradation of hydrocarbons and petroleum distillates, but several manufacturers also sell microbial products with claimed activity against aromatic compounds and other hazardous chemicals. In addition to these commercially available cultures, there are several microbial isolates that have shown success in the laboratory in degrading hazardous wastes, such as the white-rot fungus, which can degrade lignins and many other aromatic compounds.

Waste treatment technologies based on the principle of bioaugmentation have also been developed. In U.S. Pat. No. 4,850,745, Hater et al. describe a bioaugmentation technique by which a system for treating soil contaminated by petroleum hydrocarbons is designed by applying in a dry form a suitable bacterial culture capable of degrading petroleum hydrocarbons to the bottom of an excavated cavity. A system of distribution piping capable of supplying nutrients directly to the cultures and also an air flow through the area containing the cultures is provided to maintain optimal growth conditions. The system described by Hater et al. seems to be operated in a closed circuit. In other words, Hater et al. do not teach or suggest the subsequent introduction of microorganisms once the initial inoculation has been made.

In U.S. Pat. No. 4,952,315, another type of bioaugmentation technique is described. Saab discloses a process for eliminating hydrocarbons contained in a contaminated soil. The desired result is obtained by using a microbiological treatment involving the use of emulsifiers permitting the separation of the contaminants from the soil in which they are found. The contaminants can then be degraded by using a biological process requiring endogenous bacteria. This approach can be somewhat lengthy as it is required to bring the contaminants in a fluid phase before having the possibility of degrading them through the action of microorganisms.

One of the most promising applications for bioaugmentation appears to be in the degradation of oil spills, since the biology of hydrocarbon degradation has been well studied. Unfortunately, most of the methods that were used so far to decontaminate major oil spills such as the Mega Borg and Exxon Valdez spills could not generate conclusive data. Furthermore, although bioaugmentation allows the introduction of microbes tailored for a given waste, it has difficulty working in practice because competition from natural microbial populations requires large inoculum sizes, and because cultured organisms cannot always handle the stresses present in natural environments.

Bioremediation offers some concrete advantages over competing methods. It is a destructive technology that offers a permanent solution to hazardous waste problems, without the need to remove the wastes off-site. It utilizes a natural process that does not itself create environmental problems. Even though in situ biostimulation requires preliminary laboratory assessment, it can be implemented quickly and inexpensively at most sites. Soil bioremediation has been estimated to be far less expensive than incineration or land disposal, and competes well with other available options, like recycling.

However, bioremediation, either through biostimulation or bioaugmentation, has its limitations. Hence, bioremediating soil will generally take longer than excavation for incineration or landfilling. Also, biostimulation is often insufficient to provide degradation of contaminants at acceptable levels while in the case of bioaugmentation, one of the major problems seems to reside in the fact that it is difficult to maintain the cultures introduced at the beginning of the process to optimal levels.

SUMMARY OF THE INVENTION

In accordance with the present invention, it has been found that the periodic irrigation of a contaminated mass of particulate solids with a culture medium which may contain one or more appropriate bacterial strains endogenous or indigenous to the contaminated mass and having the ability to degrade organic contaminants leads to substantial improvements in yield when compared to biostimulation techniques and conventional bioaugmentation techniques in which the mass to be decontaminated is inoculated only once.

The present invention therefore relates to a method for the biodegradation of organic contaminants in a mass of particulate solids. The method comprises providing a contaminated mass of particulate solids on an impervious surface in fluid communication with an impervious recovery reservoir. The impervious surface has operating thereon air supply and/or air suction means to provide suitable and continuous oxygenation of the mass and/or to remove undesirable vapor emissions from the mass. The contaminated mass is then irrigated by periodically applying on its surface a culture medium which may comprise at least one bacterial strain and cosubstrates thereof. The bacterial strain is either endogenous or indigenous to the contaminated mass and has the ability to degrade the undesirable organic contaminants. The medium is drained through the mass and recuperated in the recovery reservoir and the washings are to be reused to irrigate the contaminated mass. The mass is periodically mixed and its temperature and moisture level are controlled to monitor the biological activity of the bacterial strain and to permit adjustment of the biological conditions inside the mass to maintain bacterial levels suitable for the strains to degrade undesirable contaminants. The expression "culture medium" when used herein is entitled to designate a solution containing various nutrients, co-substrates and optionally surfactants to be added to the contaminated mass as well as a vehicle for the bacterium inoculates that may be introduced periodically to the contaminated mass.

Hence, the process of the present invention provides a method by which levels of active microorganisms can be maintained in the contaminated mass to maintain decontamination conditions which are as optimal as possible. The bacterial culture applied on the contaminated mass through irrigation can be applied either continuously or at periodic intervals, depending on the overall level of contamination and the desired decontamination time.

Preferably, the impervious surface used in the method of the present invention is sloped to enable recovery of the washings drained through the contaminated mass. Also, the air supply and/or air suction system preferably comprise a series of perforated conduits connected to an air compressor operable in suction and/or compressed mode. The perforated conduits are preferably located inside a gravel bed and the compressor has an activated charcoal filter which is operated when the system is in the suction mode.

The culture medium applied to the mass may comprise specific nutrients such as nitrogen and phosphorus and surfactants to improve the efficiency of the microbial cultures present in the medium and in the soil. More preferably, the bacterial medium is provided from a medium delivery unit allowing to maintain the strains used to decontaminate the mass or from the recovery reservoir in which it is introduced prior to initiating decontamination. The culture medium may be applied on the mass by being pumped from the delivery unit or the recovery reservoir through a plurality of sprinklers or a perforated double-partition resilient irrigation tubing network in fluid communication with the delivery unit. The sprinklers and resilient tubing are respectively located above and on the mass to be decontaminated. The culture irrigated through the mass can be reused by being pumped from the recovery reservoir through the sprinklers or the tubing network. The recovery reservoir can also combine the dual function of delivery and recovery, in which instance the culture medium is directly introduced in it and combined with the washings to irrigate the contaminated mass. The temperature and moisture level of the mass may be measured by a plurality of thermocouples and appropriate sensors inserted in the mass. Other preferred features include the direct oxygenation of the recovery reservoir to maintain the bacterial population present in both the culture medium and the washings as well as the use of an impervious cover placed over the contaminated mass to segregate rain water and to assist in maintaining optimal temperature levels.

Also within the scope of the present invention is a system for the biodegradation of organic contaminants in a mass of particulate solids. A known system for the biodegradation of organic contaminants comprises a sloped impervious surface having thereon air supply and/or air suction means to provide suitable and continuous oxygenation of the mass or to remove undesirable vapor emissions from the mass. It also comprises an impervious recovery reservoir in fluid communication with the sloped impervious surface, a storage container having therein a solution containing nutrients and spraying means connected to the storage container to irrigate the mass by spraying the nutrients on the mass, the solution being drained through the mass and recovered in the reservoir to be reused to irrigate the mass.

In the system of the present invention, one improvement comprises substituting the storage container by a medium delivery unit in which a culture medium may comprise at least one bacterial strain and co-substrates thereof is maintained. The system of the present invention also comprises means to continuously measure the temperature and moisture level of the mass to monitor the biological activity of the bacterial strain and to maintain the activity at levels sufficient for the bacterial strain to degrade the contaminants in the mass. As mentioned previously, the means to measure the temperature and moisture of the mass may preferably comprise a series of thermocouples inserted in the contaminated mass. Means to provide suitable oxygenation of the impervious recovery reservoir which, as mentioned previously, may be used alone and combine the dual delivery-recovery function, are also provided.

The following is a description by way of example of preferred embodiments of the present invention, reference being had to the following drawings in which, FIG. 1 is a side elevation of a preferred embodiment of the biotreatment system of the present invention;

DETAILED DESCRIPTION OF THE INVENTION

The present invention relates to a method for the biodegradation of organic contaminants in a mass of particulate solids through continuous application of culture medium on the mass to be decontaminated. It also relates to a system for carrying such method. The parameters that usually affect the efficiency of biodegradation of various wastes such as oily waste residues include the presence of active organisms, oxygen supply, the addition of nutrients, the use of surfactants, the presence of co-substrates, the temperature, the moisture level and the pH. Hence, the choice of the site design must take most of these parameters in consideration to allow maximum efficiency of the bioremediation process.

Figure 1:
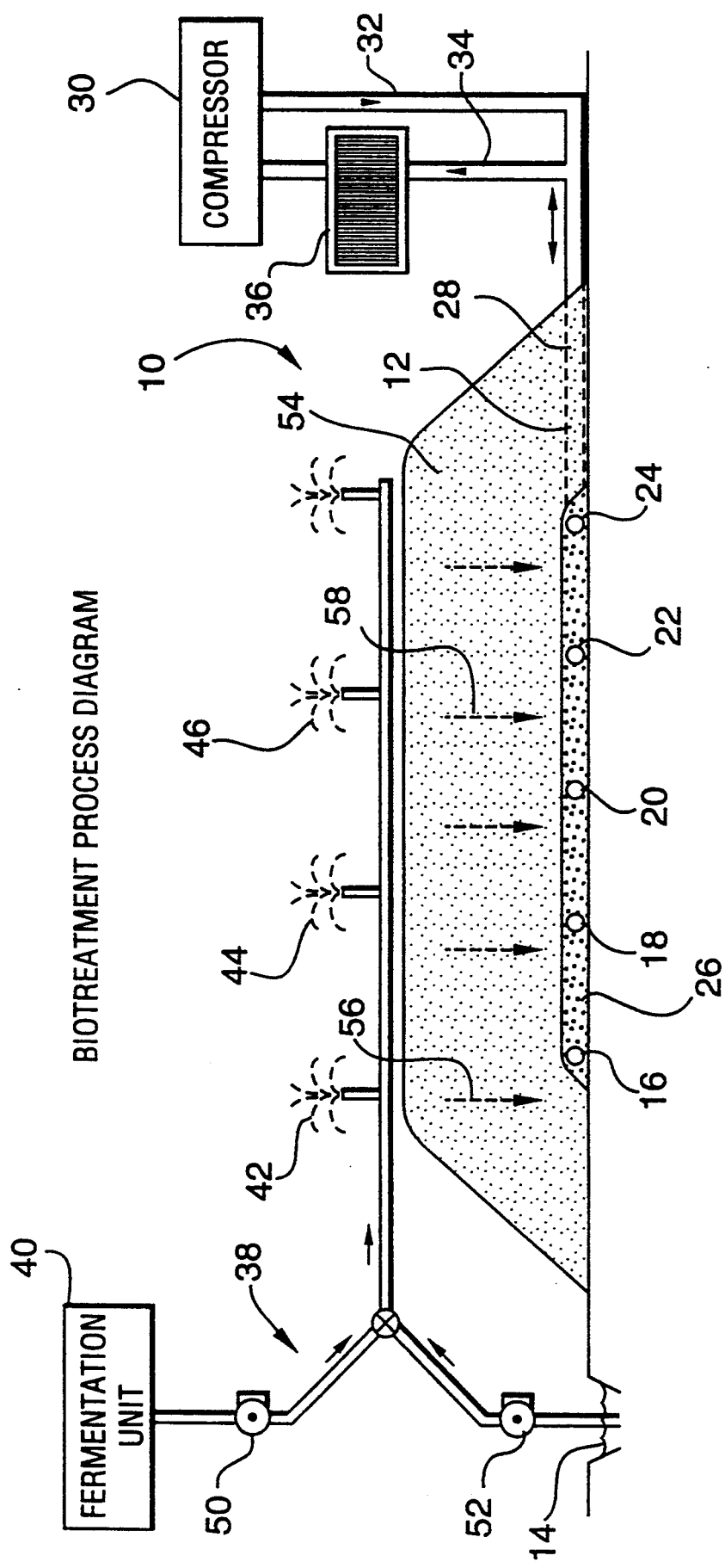

Referring now to FIG. 1, a preferred embodiment of the decontamination system of the present invention, generally designated by reference numeral 10, comprises a sloped impervious surface 12. The impervious surface 12 is preferably made of a material such as concrete, asphalt, polyethylene or other suitable polymeric plastic and has a sufficient inclination to permit recovery of the washings, preferably between 1 and 3%. The impervious surface 12 is connected to an impervious recovery reservoir 14 in which culture medium washings may be collected. On the impervious surface 12 is installed an air distribution system comprising a series of perforated pipes 16, 18, 20, 22 and 24 which are placed in a gravel bed 26. The gravel bed is optional but it appears to provide better distribution of the air provided to the contaminated mass. The perforated pipes 16, 18, 20, 22 and 24 are linked to pipe 28 leading to an air compressor 30. The compressor 30 may be chosen to allow operation in suction mode as well as compressed mode. In both the suction and the compressed mode, air is provided to maintain suitable aeration of the contaminated mass. However, the compressed mode may also serve to control the air temperature and hazardous vapor emissions if required. When the compressor is operated in compressed mode, air is passed through pipe 32 and when the compressor is operated in the suction mode, air is passed through pipe 34 and activated charcoal filter 36 or a peat absorbent filter (not shown) to recover gaseous contaminants.

The decontamination system 10 also comprises an irrigation system, generally designated by reference numeral 38. The irrigation system 38 comprises a medium delivery unit 40 to provide nutrients, surfactants, bacteria inoculates and required co-substrates to the contaminated mass. The irrigation system 38 also comprises a series of sprinklers 42, 44, 46 and 48 in fluid communication with both the delivery unit 40 and the recovery reservoir 14. Pumps 50 and 52 are provided to supply culture medium to the sprinklers 42, 44, 46 and 48 through either the delivery unit 40 or washings accumulated in the recovery reservoir 14.

To operate the decontamination system of FIG. 1, a decontamination site should first be constructed with a proper slope on which is installed impervious surface 12 in such a fashion as to allow collection of washings in the recovery reservoir 14. Perforated pipes 16, 18, 20, 22 and 24 are then placed on the impervious surface 12 and covered with a gravel bed 26. The contaminated mass of particulate solids 54 is then piled on the gravel bed 26 and irrigated with a culture medium pumped from the delivery unit 40 through pump 50 and sprinklers 42, 44, 46 and 48. As the microorganisms contained in the culture medium diffuse through the contaminated mass 54 in the direction indicated by the arrows 56 and 58, compressor 30 is operated to provide suitable oxygen levels to maintain optimal activity of the microorganisms introduced in the soil and to provide sufficient oxygenation for the organisms already present in the contaminated mass. Once the culture medium pumped through the sprinklers from the delivery unit 40 has reached the bottom of the contaminated mass 54, its washings are drained in the recovery reservoir 14 and may be pumped through pump 52 to be reused again. Drained culture medium (or washings) is therefore recirculated through this system and analysis of phosphorus and nitrogen levels found in the washings are used to optimize fresh medium addition.

The frequence at which the contaminated mass is irrigated and the amount of culture medium that is provided depends on various factors including the level of contamination of the particulate mass and the time within which the contaminated mass is to be decontaminated. Preferably, the culture includes nitrogen, preferably of a concentration between 3 and 5 ppm, phosphorous, preferably at a concentration of 0.3-0.5 ppm.

The bacterial strains that are used are selected for their ability to degrade the contaminants present in the mass of particulate solids. Incubation of the bacterial strain can be done on-site and thermocouples linked to a digital data collection system as well as suitable sensors are respectively used to monitor temperature and moisture levels in the contaminated mass.

Figure 7:
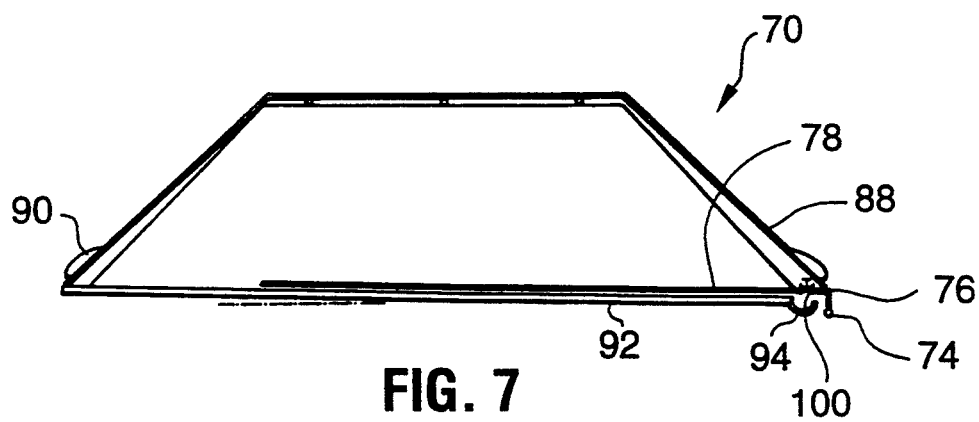
FIGS. 7 and 8 represent side elevations of another embodiment of the biotreatment system of the present invention.
Figure 8:
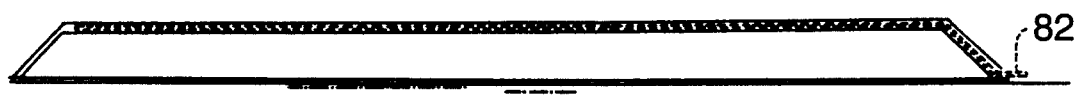
Figure 9:
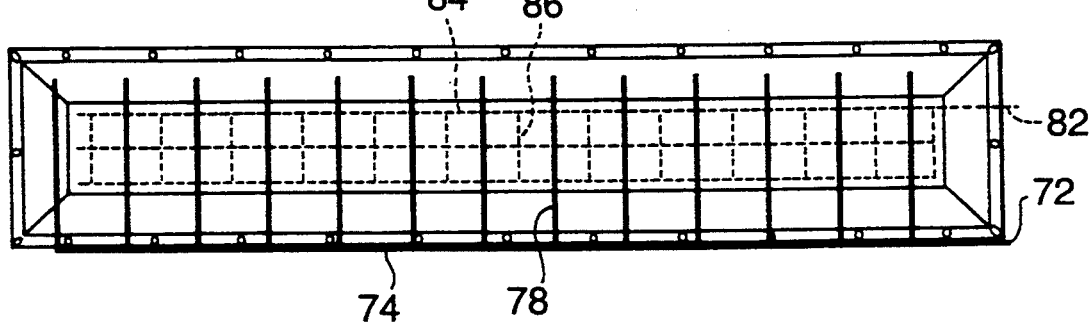
FIG. 9 represents a plan view of the biotreatment system of FIGS. 7 and 8.

Another embodiment of the decontamination system of the invention is shown in FIGS. 7, 8 and 9.

Referring to FIG. 7, the decontamination system, generally designated by reference numeral 70, has an impervious surface 92 which usually presents an inclination of 1 to 3% in order to provide suitable recovery of the culture medium washings. The impervious surface 92 is preferably either a polyethylene membrane or a concrete or asphalt lining. The impervious character of the sloped surface 92 is particularly important to avoid the introduction of contaminants in non-contaminated soil. The impervious surface 92 may be sloped in such a manner as to taper from the center of the contaminated mass towards each of its side or from one side of the contaminated mass to the other. The impervious surface 92 leads to a concrete channel 94 in which the washings are collected. The channel 94 may contain gravel (not shown). The channel 94 is protected by cover 88 to prevent rain water to be introduced in the system. Channel 94 is connected to a recovery reservoir (not shown) that is used to contain the culture medium and to recover the washings from the decontamination process. The recovery reservoir may be oxygenated in order to provide adequate conditions for the microorganisms found in the washings to degrade the contaminants present in the washings. Hence, the culture medium and the washings contained in the recovery reservoir can be oxygenated either by providing air through suitable air supply means (not shown) or by adding chemical substances such as hydrogen peroxide. The culture medium and the washings are sprayed on the contaminated mass by being pumped from the collecting reservoir through the irrigation system 82 using a pumping system similar to the one used in the previous embodiment.

A cover 88 is placed over the contaminated mass and the irrigation system 82 which is described in further detail later on. Preferably, the cover 88 may be an impervious cloth which may be maintained in position using weights such as sand bags 90 that prevent the cover 88 from being blown loose by winds. Another arrangement that can be used to maintain the cover 88 in position is to provide a hose (not shown) filled with water or any suitable liquid, circling the cover 88 at the bottom of the pile. The cover 88 is used for at least three purposes. Firstly, it allows segregation between the rain waters and the waters used in the decontamination process. Secondly, it prevents the escape of volatile components generated from the decontamination process. Thirdly, it provides an isolation feature that enhances the overall efficiency of the heating of the mass.

The air distribution system, generally designated by reference numeral 72, comprises a main pipe disposed longitudinally to the pile and designated by numeral 74 (FIG. 9). A series of perforated transversal pipes 78 are connected to the main pipe 74 to provide even oxygenation of the contaminated mass.

The transversal pipes are preferably spaced apart by a distance of about 3 meters. Each of the perforated pipes is controlled by suitable valve means 100 (FIG. 7). The perforated pipes 78 are located underneath the contaminated mass and on the impervious surface.

The use of gravel to cover the perforated pipes 78 is foreseeable but optional, although in some instances it may increase the speed at which decontamination is carried out. However, in instances where treated soil is to be removed and new contaminated soil is to be added to the site, the use of gravel does not appear to be practical. This decrease in air distribution efficiency incurred from not using gravel can be obviated by increasing the number of perforated transversal pipes.

The perforated pipes 78 are linked to an angled member 76 which is linked to the main pipe 74. The main pipe 74 is linked to an air compressor (not shown) which is similar to the air compressor described in the embodiment shown in FIG. 1.

The irrigation system, generally designated by reference numeral 82, is made of a series of perforated double-partition irrigation tubes 84 and 86 which are best illustrated in FIG. 9. Referring to FIG. 9, the irrigation system 82 comprises a series of transversal and longitudinal perforated double-partition irrigation tubes respectively designated by reference numerals 84 and 86. The perforated double-partition irrigation tubes 84 and 86 are usually made of a flexible material similar to the material used to make regular watering hoses.

The tubes 84 and 86 are interconnected through a series of valves (not shown) that allow for the partial operation of the irrigation system 82. This type of irrigation system allows for continuous operation of the apparatus. Hence, in instances where the contaminated mass to be treated is not provided all at once, the system can be partially operated and the treated mass can be removed and replaced by additional contaminated mass.

This makes the overall decontamination operation more flexible.

Contrary to the embodiment described previously, the irrigation system is not provided with sprinklers. However, the double-partition irrigation tubes 84 and 86 allow for a slow release of the culture medium, which cannot be done easily when sprinklers are used. By using these tubes, the resulting irrigation allows for a more permanent control of the moisture level of the contaminated mass as the irrigation rates can be brought down to very low levels. This is not possible when sprinklers are used, as one has to irrigate the system and stop until the sprayed culture medium is infiltrated in the contaminated mass. At the beginning of the decontamination process, the system is operated in the suction mode. The irrigation rates, when using the second embodiment, may be such that continuous irrigation is possible. The culture medium itself can be pre-oxygenated, thereby eliminating the need to initially operate the system on a compression mode. When volatile substances are no longer at undesirable levels, the compression mode may be used. If the system is operated in cold temperatures, the compressed air is warmer than the ambient temperature and consequently heats the contaminated mass. As mentioned previously, the use of the cover 88 also allows better conservation of the heat generated by the compressed air.

Although it may be useful to constantly irrigate the contaminated mass with the culture medium when the decontamination process is initiated, constant irrigation is not required throughout the entire decontamination process. Hence, irrigation rates may be controlled in two preferred manners. Firstly, a timer may be used to activate the irrigation system at regular intervals, for example every 12 hours, for a predetermined period of time, for example 1 hour. The rate of irrigation and the volume of culture medium to be used is calculated and adjusted depending on the hydraulic conductivity of the soil and according to the type of soil to be decontaminated. Alternately, a moisture indicator can be inserted in the contaminated mass and set to activate the irrigation system when the moisture reaches a certain level. The rate at which the culture medium may be provided varies depending on the amount of liquid which can be reatined by the particular soil under study. This capacity is at least a function of the size of the particles contained in the soil. This varies substantially depending upon the type of soil. For instance, clays will retain much more water than sands. All the poured liquid leaches out after having saturated the soil with water and waited 24 hours before pouring if the pouring rate is not superior to the infiltration rate. Hence, the moisture indicated is to be adjusted to operate only when water in the contaminated mass has an infiltration pouring rate similar to the infiltration rate. In other words, the rate of pouring of the medium is a function of the infiltration rate of the soil to be decontaminated. The rate at which the culture medium is added is not particularly related to the level of contaminants found in the contaminated soil, the purpose being to effect decontamination as quickly as possible. Ideally, soil should be constantly irrigated as long as its macropores are filled with air. This is done by measuring the "field capacity" (capacité au champs) of the soil to be decontaminated.

The volume of contaminated mass that can be decontaminated at once using either embodiment of the system of the present invention varies depending upon various parameters, at least as far as width and length of the mass are concerned. The length of the contaminated mass is not critical and may be adjusted depending on the size of the system. With regard to the width, it is important to consider that, as the contaminated mass has to be turned periodically, the width may vary with the means available to turn the mass. Generally, preferred width varies between 9 and 14 meters. As far as the height of the contaminated mass is concerned, the optimal height will range between 2 and 3 meters. Heights exceeding 3 meters can be foreseen but the efficiency of the decontamination process is usually reduced as irrigation and oxygenation of the contaminated mass becomes more difficult. On the other hand, heights below two meters are not interesting as the volume that can be decontaminated at once is reduced, thereby increasing the costs of the overall operation. Furthermore, a contaminated mass of reduced height exhibits less thermal inertia. Decreases in thermal inertia usually mean that during cold nights, the overall temperature of the contaminated mass would fall too rapidly.

The volume of air that may be introduced to oxygenate the contaminated mass may vary from $\frac{1}{2}$ to 2 times the overall volume of the contaminated mass an hour. Optimally, the volume of air introduced in the contaminated mass every hour should be the same as the volume of the contaminated mass itself. The air can be heated to maintain optimal decontamination conditions. This may be particularly interesting if decontamination is to be effected in cold climates.

It is important to mention that the compressor may also be operated permanently or controlled using a suitable timing system. For example, when treatment of the contaminated soil is almost completed, not as many air changes are required as not as many contaminants are to be degraded. As mentioned previously, at the beginning of the decontamination process, oxygen can be provided by adding an oxygenated culture medium in order to limit volatilization of the gaseous contaminants. Another manner in which the escape of volatile gases may be controlled is by introducing a sensor in the contaminated mass to determine the rate of volatile products. When the rate of escape of volatile contaminants is at high levels, oxygenation through the compressor may be interrupted and restarted when the rate has decreased to acceptable levels. Typically, the level of volatile contaminants should be maintained below 260 mg/m$^3$ an hour for benzene, 300 mg/m$^3$ an hour for naphtalene and 200 mg/m$^3$ an hour for toluene for example.

With regard to the microorganisms used in the decontamination process, various types of organisms may be used depending on the type of contaminant present in the contaminated mass. Generally speaking, the strains used are isolated from contaminated sites and assayed for their ability to degrade a given contaminant. They may be used either as pure cultures or as mixed cultures, being mixtures of microorganisms. In the case of hydrocarbons, for example, various Pseudomonas strains such as, *Pseudomonas putida* may be used. In the case of PCPs, various bacterial strains can be used as well as various spores such as *Coriolus versicolor* and *Sphanerochaete chrysosporium*. Although the selection of the strain is of some importance, the method by which a given strain is selected to be used in bioremediation is relatively well known by those skilled in the art.

The pH of the contaminated soil usually has to be maintained between 6 and 8. Many ways can be used to maintain the required pH that will not be harmful to the organisms in the culture. One example is to use lime.

Anionic or non-ionic surfactants can also be added to the contaminated soil in preferred concentrations of about 0.01% in the culture medium in order to reduce surface tension. The types of surfactants that may be used are commercially available surfactants that are well know by those skilled in the art.

The growth medium is incubated after inoculation with the proper culture for a sufficient period of time to allow the microorganisms to grow. The microorganisms may be cultured in a laboratory to a high concentration to form a stock solution. Alternately, the microorganisms may be cultured only until a suitable microorganism culture suspension for carrying out the process is achieved. For example, in the laboratory, microorganism concentrations of about $1 \times 10^{10}$ can be produced and diluted to $1 \times 10^6$ or $1 \times 10^7$ prior to being used to irrigate the contaminated mass. The culture medium can be maintained on the site by using appropriate co-substrates.

As far as inoculation rates are concerned, it has been found that regular inoculation provides more adequate conditions for achieving suitable decontamination levels. Whereas most prior art processes provide designs that allow only a single inoculation of the contaminated soils, the process and system of the present invention contemplates periodic inoculation. Preferably, inoculation can be effected every two weeks as an average and typically, the concentration of microorganisms introduced in the contaminated mass ranges from $10^6$ to $10^7$ per cubic meter of water for each 100 m$^3$ of contaminated mass.

Important aspects that have been developed to improve bioremediation of organic contaminants include the use of a fabric cover, the possibility of constantly irrigating the contaminated mass by providing an apparatus allowing low irrigation levels, the possibility of oxygenating the reservoir in which washings are recovered and the possibility of controlled moisture levels through appropriate probing means. It is also important to mention that the design of the second embodiment allows one to partially operate the apparatus and to replace decontaminated soil by other contaminated masses in a relatively easy fashion.

The process of the present invention provides means to allow maximum control of the conditions favoring efficient decontamination of particulate solids while eliminating the risk of contaminants migration to surrounding ground waters. Furthermore, the availability of large amounts of bacteria through multiple inoculation allows the possibility to maintain optimal biological activity throughout the process.

The following examples are introduced to illustrate rather than limit the process of the present invention.

EXAMPLE 1

Biological remediation of shoreline oily waste from a marine spill.

On May 8, 1988, the collision of the oil tanker Czantoria with a dock located in the port of Quebec city resulted in a 2000 to 3000 barrels spill of light crude oil in the St-Lawrence river. Subsequently, two types of shorelines were affected. The first type of shoreline consisted of beaches mostly composed with granular materials such as sand, rock and silt. The second type of shoreline consisted of marshes containing various types of weeds.

Oily waste was collected separately from those two types of shorelines for subsequent treatment and disposal. Approximately 300 m$^3$ of material was contaminated with up to 30% of oil and could not be disposed of in landfill sites or local incinerators.

The decontamination operation was done in two phases using the system illustrated in FIG. 1; a first phase of 10 days in the fall of 1988, and a second phase from May to November 1989. During the first phase, two piles of waste were placed on the impervious surface; one pile of granular material (sand, soil, rocks and silt), and one pile of weeds and woody material. The site was operated for 10 days from Nov. 29, 1988 to Dec. 9, 1988. The operation was ended because it was no longer possible to prevent water freeze-up.

The site was re-opened in May 1989. In June, it became evident that water flow in the granular pile was no longer suitable for an efficient activity. The site was then redesigned to contain only one mixed pile. Mixing was done again in July and in September based on temperature variations analysis.

In both phases, a culture medium containing phosphorous and nitrogen sources, a biodegradable surfactant having an alcohol polar substituant to increase the mobility of the contaminants, at least one hydrocarbon degradating the bacterial strain at a concentration of $10^6$ and a suitable co-substrate at a concentration level of 100 ppm was used.

The pH of the contaminated soil was corrected to be within the range of 6 to 8 by treating the soil with dolomitic lime. Inoculation was conducted every day during which approximately 240 liters of the medium were sprayed at a rate of 20 l/min for 2 hours.

The site was closed on November 1989 when contamination level was below 1%.

Evaluation of the various parameters of the process

1. Temperature

Figure 2:
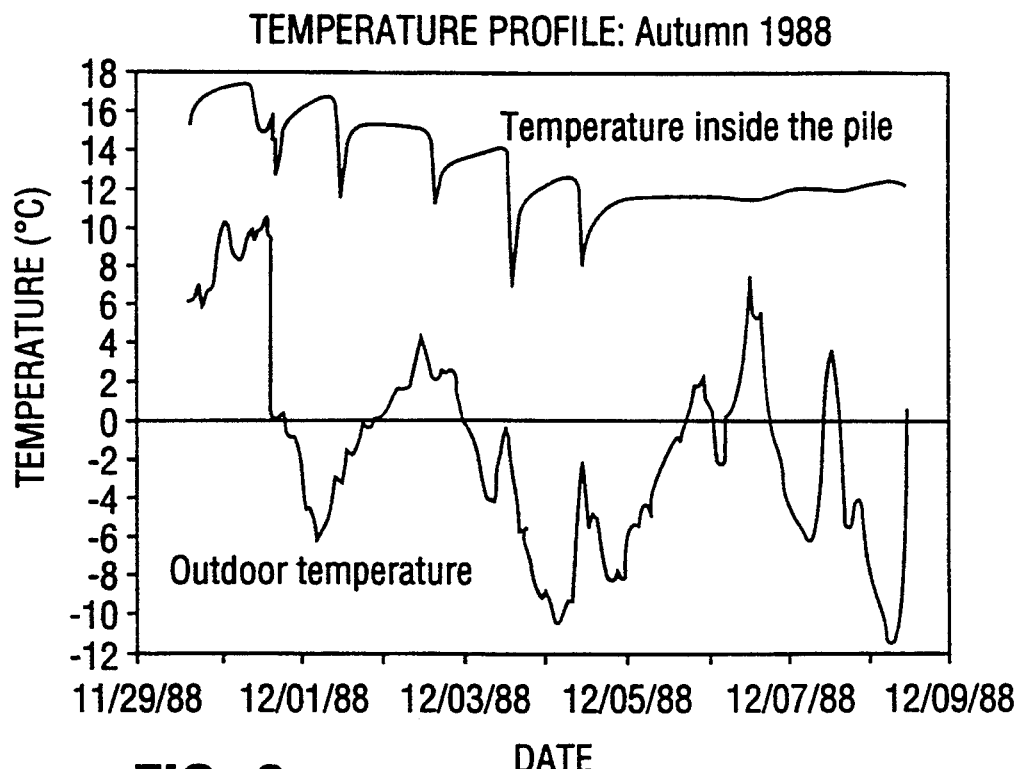
FIGS. 2 and 3 represent a comparison of the temperature inside and outside the contaminated mass at various intervals during the decontamination of hydrocarbons using the process of the present invention.

It has often been said that bioremediation only works within a very narrow time window in cold latitudes because of problems in maintaining suitable temperature. This is likely to be the case for landfarming when a thin layer of waste is spread on a wide surface. However, the design of the present invention works at much colder temperatures than what is considered to be the limit for landfarming. In fact, it seems that the process is efficient even at $-20°$ C. The reason for this increased efficiency is the fact that compressed air is warmer and the pile thickness generates friction that increases air temperature furthermore. Also, heat created by biological activity is less susceptible to dissipation in ambient air. FIG. 2 illustrates this phenomenon for the first 10 days of operation. Sharp decreases in the pile temperature are caused by periodical addition of nutrient solution.

Figure 3:
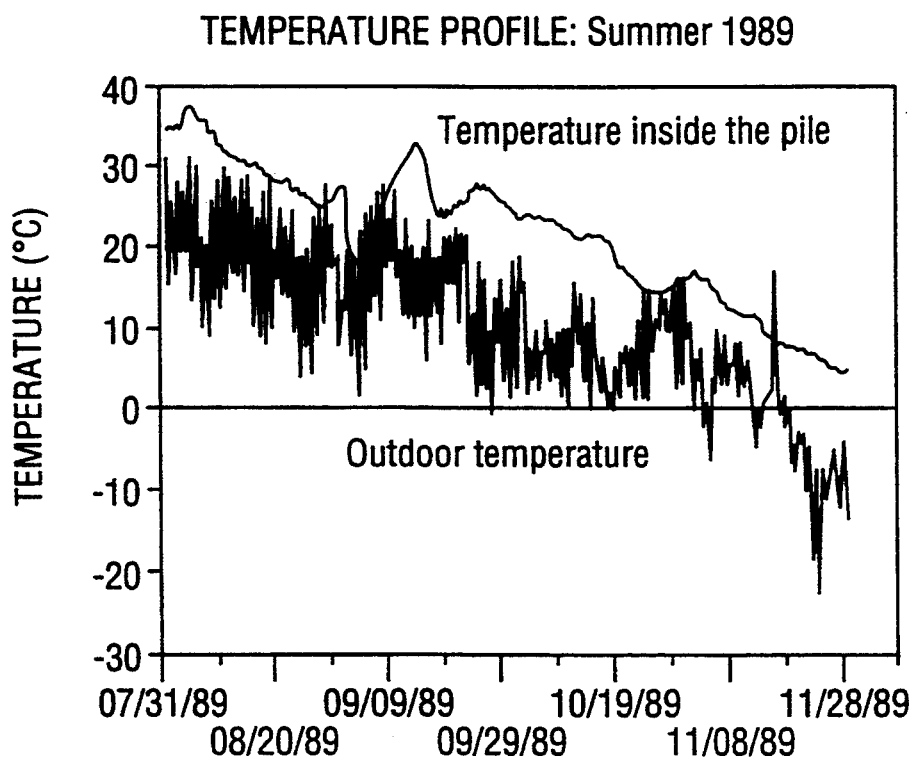

FIG. 3 shows the temperature curves for the remainder of the operation. It is important to note that the pile temperature increases sharply right after each mixing operation. The decrease in September was caused by operating the compressor on suction mode.

Figure 4:
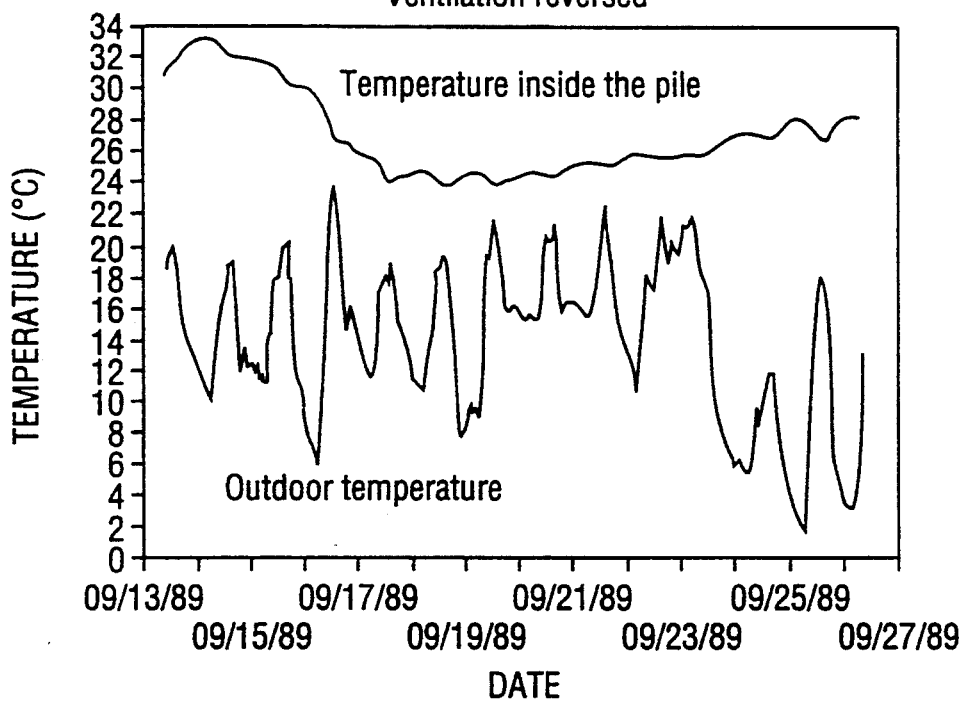
FIG. 4 represents a comparison of the temperature inside and outside the contaminated mass at various intervals during the decontamination of hydrocarbons using the process of the present invention when the compressor was operated in the suction mode.

FIG. 4 illustrates the temperature variations during 13 days while the compressor was operated in this fashion. Even though lower than during the compressed air mode, the pile temperature was always kept above ambient temperature. One of the most important features of this bioremediation process is the stability of the pile temperature when in diurnal cycles.

Oil and grease degradation

Figure 5:
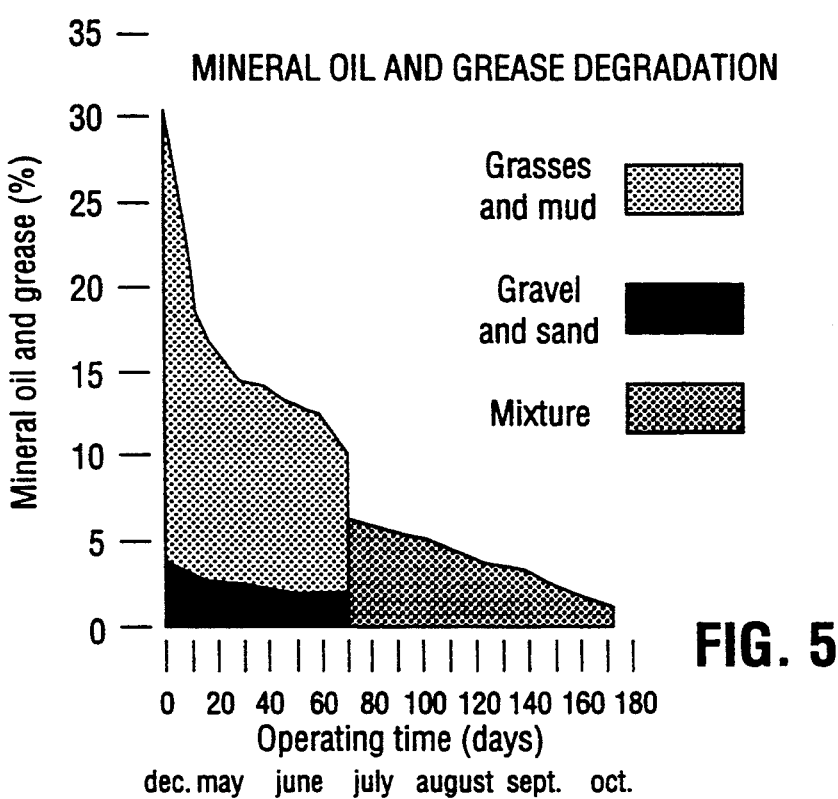
FIG. 5 represents oil and grease concentration throughout the decontamination of hydrocarbons using the process of the present invention.

FIG. 5 shows the evolution of oil and grease concentrations. The first 10 days represent operation in the fall 1988 and the remaining 160 days being related to the 1989 operation. Up to the 68th day, two curves are shown, one for the granular material and one for weeds. From the 69th day, only one day is shown representing the mixed pile, oil and grease concentration.

Initial concentrations were respectively 30.5 and 3.9% in weeds and granular material. Before mixing the two piles, concentrations were down to 10.0 and 1.7%. Average concentration of the mixed pile was 6.3%, reduced to 1.1% at the end of the operations.

It must be pointed out however that oil and grease analysis is only performed on fine materials. Table I shows the breakdown of materials found in the combined waste pile. This was obtained by analyzing a representative sample of 20 kilograms. Rocks and large pieces of woody material were not tested for oil and grease. Since these can be considered very slightly contaminated—oil and grease % weight close to 0—their relative contribution to the pile (50%) allows a redistribution of the tested level of 1.1% of the entire waste, bringing it closer to 0.52%.

Leachate test results indicated that the remaining material would not contaminate soil and groundwater. All tests showed $\leq 0.2$ ppm oil and grease; acceptable limits for sanitary landfill sites is 15 mg/kg.

TABLE 1

| | |
|---|---|
| Fine materials (weeds, clay, sand) | 47.3% |
| Large rocks (>5 cm diam.) | 15.4% |
| Small rocks (<5 cm diam.) | 31.4% |
| Coarse woody material | 5.9% |

Polyaromatic hydrocarbons (PAH's)

Figure 6:
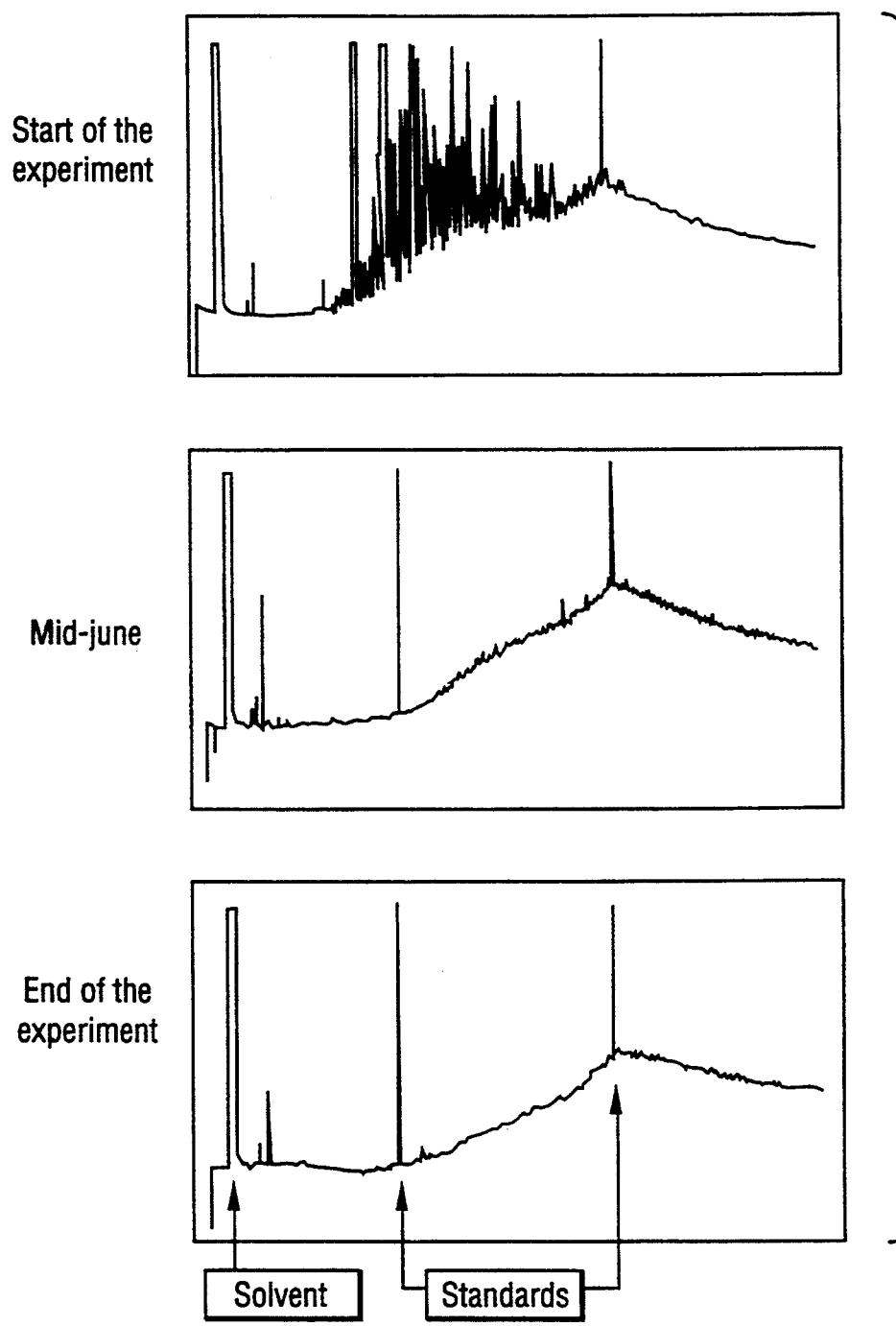
FIG. 6 represents chromatograms showing the progression of PAH's degradation during the decontamination of hydrocarbons using the process of the present invention.

FIG. 6 and Table 2 show the progression of PAH's degradation during the process. The chromatograms clearly show the disappearance of the characteristic PAH absorption peaks. No single PAH was found to be in excess of the regulated level for residential areas.

The low value for initial naphthalene concentration (3.8 ppm) is an indication that much of the original volatile PAH's were lost to the atmosphere during the first days of the spill.

TABLE 2

| | PAH's degradation | | |
|---|---|---|---|
| P.A.H. | NOV. 88 | JUNE 89 | NOV. 89 |
| Naphthalene | 3.8 | n.d. | n.d. |
| Acenaphtylene | 25.6 | 0.6 | n.d. |
| Acenaphthene | 20.7 | 3.4 | 0.4 |
| Fluorene | 45.8 | 3.1 | 1.4 |
| Phenanthrene | 97.6 | 14.5 | 1.8 |
| Anthracene | 27.7 | — | 0.8 |
| Fluoranthene | 6.5 | 0.6 | 1.2 |
| Pyrene | 34.2 | 18.0 | 1.0 |
| Benzo(a)fluoranthene | 15.5 | .06 | 0.4 |
| Benzo(b)fluoranthene | 5.3 | 0.7 | 0.1 |
| Benzo(k)fluoranthene | — | 1.4 | 1.0 |
| Benzo(a)pyrene | 0.5 | 0.7 | 0.3 |
| TOTAL PAH | 283.2 | 44.0 | 8.5 |

Biological activity

At various times during the operation biological activity was measured through bacteria count. At all times count was maintained above $1 \times 10^7$ units/g soil, with a peak count of $3.6 \times 10^9$ units/g in June 1989. Through growth analysis it was found that 100% of the microorganisms present in the soil had affinity for petroleum hydrocarbon substrates. Hence, in instances where the microflora in the contaminated soil is abundant because of a large variety of carbon sources as it is the case in this example, the addition of microorganisms may not be necessary or useful because of competition from strains already present in the mass.

The present example demonstrates that bioremediation can be an efficient mean of degradating and disposing of oily waste from marine spill shoreline cleanups. In fact, disposal costs have been shown to be about 4 to 8 times less than transportation and disposal at a landfill site.

Content in oil and grease can be reduced to values under 1% with leaching potential of close to 0 ppm. The actual requirements for sanitary landfill in Quebec are respectively 5% and 15 mg/kg for oil and grease, and leaching. Hence, these requirements were met when using the process of the present invention. It seems that some of the key factors that were found to be of considerable importance when operating the bioremediation process of the present invention were the following:

- sound management practices and tight control are essential to achieve efficient bioremediation;
- good water drainage is essential to maintain low compaction and adequate air circulation;
- constant temperature measurement is necessary to accurately monitor biological activity;
- periodical mixing is indicated from temperature readings must be performed to maintain the system at its peak performance level.

EXAMPLE 2

Biorestoration of soil contaminated with PCPs.

The system used in this example was the system shown in FIGS. 7-9.

The contaminated soil to be treated was siltous sand having a relatively weak permeability. Extended spraying periods were thus required in order to allow suitable absorption of the nutrients medium to avoid liquid build-up at the surface of the pile. The compaction levels of the pile increased as its permeability decreased, and hence turning the pile was essential to maintain a soil structure that was as loose as possible.

120 cubic meters of the contaminated soil which initially exhibited PCP levels of 115 ppm was placed on an impervious concrete surface having a thickness of 50 mm and an inclination of 1%. The air distribution system located between the concrete surface and the contaminated pile was covered with gravel. This gravel bed was useful to increase air diffusion and the drainage of the pile. It turned out that it was only moderately effected when the pile was turned. A fabric cover made of fabrene was deposited on the contaminated mass. It turned out to be suitable to control rain water and to help allow efficient recirculation of air. Also, the fabric covers increased the heating efficiency of the pile.

The concrete surface was in fluid communication with a 2000 liter underground recovery reservoir. A culture medium containing phosphorous and nitrogen sources, a biodegradable surfactant having an alcohol polar substituent to increase the mobility of the contaminants, a PCP degradating bacterial strain at a concentration of $10^6$ and a suitable co-substrate at a concentration level of 100 ppm was used.

The pH of the contaminated soil was corrected to be within the range of 6 to 8 by treating the soil with dolomitic lime in an amount of 500 kg for 120 m³ of soil prior to the first irrigation inoculation. The first inoculation was conducted on Jul. 13, 1990 during which approximately 240 liters of the medium were sprayed at a rate of 20 l/min for 2 hours. Subsequently, a soil sample was analyzed previous to each inoculation. On September 25th to October 12th, the contaminated mass was irrigated every day for 2 hours at a rate of 20 l/m and 3 times in the week of Oct. 14th, 1990 at a rate of 20 l/m for 2 hours. The last spraying was done on Friday, Oct. 19th, 1990 at a rate of 20 l/m for 2 hours. The spraying rate was augmented to increase the concentration of microorganisms in the contaminated pile toward the final stages of the decontamination process to enhance degradation probabilities as the contaminant concentration had been reduced to relatively low levels.

The pile was turned every 2 to 3 weeks, depending on the compaction state of the pile and the availability of the required machinery.

From Sep. 14th, 1990, a heating element was introduced to maintain the temperature of the contaminated pile at a suitable level. The heating was controlled by a thermostat so that the air provided to the contaminated soil did not exceed 25° C. Heating was required until the end of the decontamination process on Nov. 15th, 1990.

Certain sediments have a tendency to end-up in the recovery reservoir but they are recirculated after spraying. In fact, after spraying, allowing the pump to be constantly operated in the reservoir, homogenizes the medium. Finally, it is to be noted that during the hot summer months, operation losses were compensated by filling the reservoir with fresh water. The results obtained are shown in Table 3.

TABLE 3

| # | DATES | DAYS Bite | PCP (ppm) | O & G (ppm) | WASHINGS PCP (ppm) |
|---|-------|-----------|-----------|-------------|--------------------|
| 1 | 900707 | 0 | 115 | 700 | n/d |
| 2 | 900714 | 7 | 51,4 | 600 | n/d |
| 3 | 900718 | 11 | 36,4 | 400 | n/d |
| 4 | 900727 | 20 | 8,0 | n/d | 7,6 |
| 5 | 900810 | 34 | 7,4 | n/d | n/d |
| 6 | 900817 | 41 | 13,8 | 300 | n/d |
| 7 | 900829 | 53 | 10,8 | n/d | n/d |
| 8 | 900907 | 62 | 13,6 | n/d | n/d |
| 9 | 900914 | 69 | 12,7 | n/d | 0,6 |
| 10 | 900925 | 80 | 6,6 | n/d | n/d |
| 11 | 901001 | 86 | 6,5 | n/d | 0,25 |
| 12 | 901009 | 94 | 4,5 | n/d | n/d |
| 13 | 901015 | 100 | 4,6 | n/d | 0,02 |
| 14 | 901026 | 111 | 3,5 | n/d | n/d |
| 15 | 901115 | 131 | 1,9* | n/d | n/d |

*NOVALAB Analysis, Montreal.
Note 1:
In average, the soil fraction is equal or lower than 2,38 mm (fraction on which the analysis were conducted) represented in weight 35% of the samples. ⅔ of the soil is thus constituted by large particles.
Note 2:
The analysis methods are the following:
For PCP: EPA 8040
For oil and greases: Standard Methods 503, A & E.
n/d: non-detectable.

Figure 10:
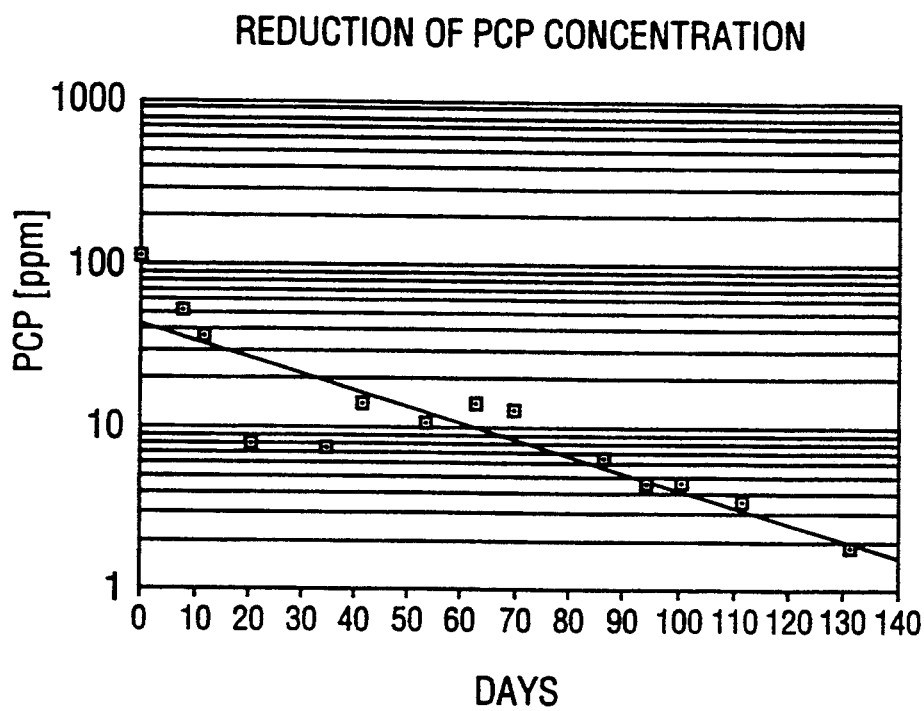
FIG. 10 represents the reduction of PCP concentration during the treatment of PCP contaminated soil using the process of the present invention.
Figure 11:
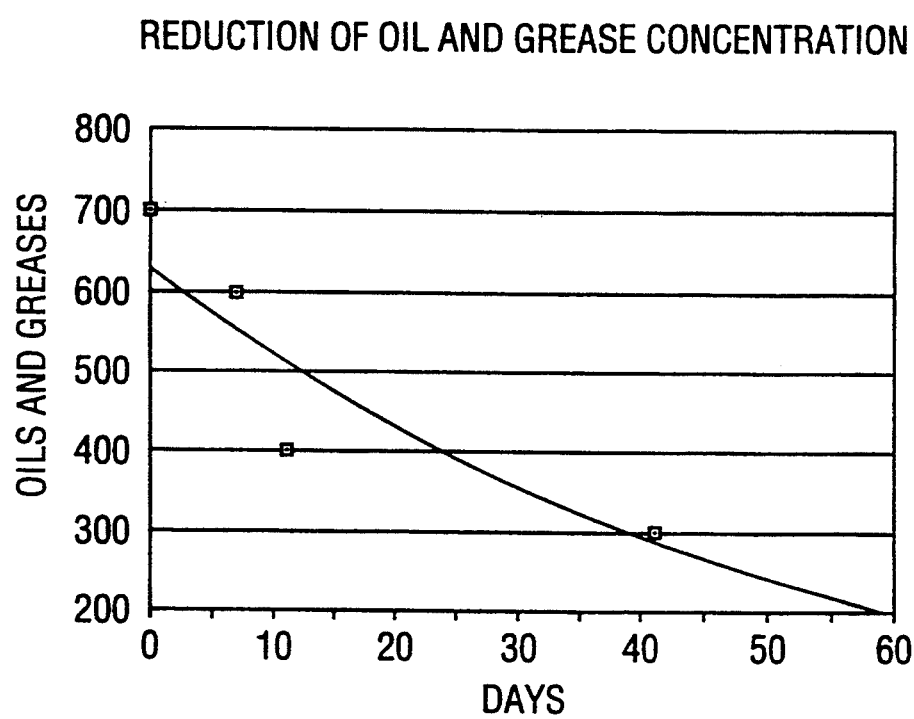
FIG. 11 represents the reduction of oil and grease concentration during the treatment of PCP contaminated soil using the process of the present invention.
Figure 12:
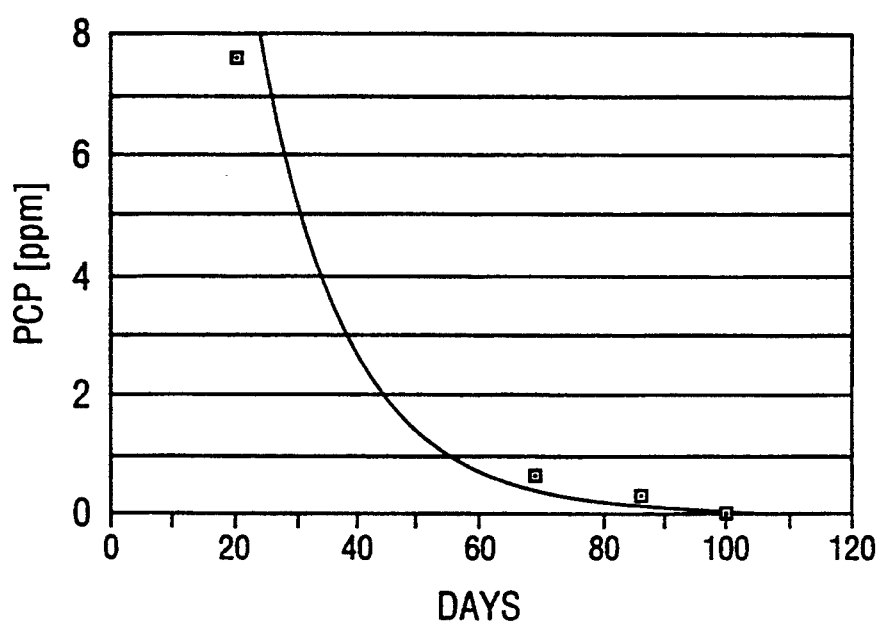
FIG. 12 represents the reduction of PCP concentration in washings from the treatment of PCP contaminated soil using the process of the present invention.

FIGS. 10–12 respectively show the reduction in PCP concentration in the contaminated pile, the reduction in oil and greases and the reduction in PCP concentration in the washings. It can be seen from the table that the inoculations made between the beginning of August and mid-September had a relatively low efficiency as the contamination level of about 10–12 ppm appeared to be maintained. The use of a co-substrate in the contaminated mass helped to provide optimal bacterial activity and this allowed further decrease in PCP level.

Concentration levels of oils and grease in the contaminated mass also decreased with time. Since a concentration of 300 mg/kg is well under residential criteria for the province of Quebec, measurement of this parameter was interrupted at this level. The few measurements provided demonstrate the possibility of obtaining relatively efficient elimination of oil and grease contaminants in soil through biotreatment.

Analysis of the washings from the treated pile showed a decrease in the presence of PCPs as the decontamination process proceeded to completion. The last analysis performed indicated a PCP level of 0.02 mg/l in the washing. This concentration usually meets standard waste levels recommended by Canadian cities for phenol. Oxygenation of the reservoir provided means to further degrade residual PCPs in the washings.

Hence, the final analyses indicated a 1.9 ppm residual concentration in PCP, which is substantially under the 5 ppm norm indicated for industrial lands in the province of Quebec. All the analyses were performed on soil particles having 2.3 mm or less in size. The results obtained are therefore overestimated as soil particles of this size represent only ⅓ of the total weight of the contaminated mass while practically containing all the PCP contaminants. Whereas the smaller particles retain contaminants through absorption and adsorption, larger particles are only slightly affected because of a surface/volume ratio that is much smaller. Also, large particles are relatively easy to treat through repeated washings. In fact, if one considers the soil to be treated as a single entity, it would seem realistic to conclude that its actual decontamination level could be closer to three times lower than the levels indicated in Table 3.

A reduction in PCP concentration in contaminated soil from 115 ppm to 1.9 ppm was achieved. This represents a contaminant reduction rate of 98% over a four month period. This is much higher than what has been previously reported in the prior art and would appear to open up new possibilities for efficient biological degradation of highly undesirable contaminants.

Claims to the invention follow.

I claim:

1. A method for the biodegradation of organic contaminants in a mass of particulate solids, said method comprising:
   a) providing a contaminated mass of particulate solids on an impervious surface in fluid communication with an impervious recovery reservoir, said impervious surface having operating thereon an air supply means to provide suitable and continuous oxygenation of said mass;
   b) periodically irrigating said mass by applying on its surface a culture medium comprising at least one bacterial strain and co-substrates thereof, said bacterial strain having the ability to degrade said organic contaminants, said medium being drained through said mass and washings recovered in said reservoir to be reused to irrigate said mass; and
   c) periodically mixing said mass and controlling the temperature and moisture level of said mass to monitor the biological activity of said bacterial strain and to maintain said activity at levels suitable for said bacterial strain to degrade said contaminants in said mass.

2. A method according to claim 1, wherein said impervious surface is sloped.

3. A method according to claim 1, wherein said air supply means comprises a series of perforated conduits, said conduits being connected to an air compressor operable in suction mode.

4. A method according to claim 3, wherein said series of perforated conduits are located inside a gravel bed.

5. A process according to claim 3, wherein said compressor comprises an activated charcoal filter system operated when said compressor is in the suction mode.

6. A method according to claim 3, wherein said air compressor also is operable in compressed mode.

7. A method according to claim 6, wherein said series of perforated conduits are located inside a gravel bed.

8. A method according to claim 6, wherein said compressor comprises an activated charcoal filter system operated when said compressor is in the suction mode.

9. A process according to claim 1, wherein said culture medium further comprises nutrients and surfactants.

10. A process according to claim 1, wherein said culture medium is provided from a fermentation unit allowing to maintain continuous growth of said bacterial strain or from said impervious recovery reservoir.

11. A method according to claim 10, wherein said culture medium applied on said mass is pumped from said fermentation unit through a plurality of sprinklers or through a plurality of perforated double-partition irrigation tubes in fluid communication with said fermentation unit or said impervious recovery reservoir, said sprinklers or tubes being located above said mass.

12. A method according to claim 11, wherein said culture medium irrigated through said mass is reused by being pumped from said reservoir through said sprinklers or tubes.

13. A method according to claim 11, wherein the impervious surface further has operating thereon an air suction means to provide suitable and continuous oxygenation of said mass and to remove undesirable vapor emissions from said mass.

14. A method according to claim 1, wherein the temperature and moisture level of said mass are measured by a plurality of thermocouples and probes inserted in said mass.

15. A method according to claim 1, wherein said mass is contaminated with hydrocarbons.

16. A method according to claim 1, wherein said mass is contaminated with PCBs.

17. A method according to claim 1, wherein said reservoir is oxygenated to maintain bacteria in said washings.

18. A method according to claim 13, wherein said oxygenation is realized by either blowing air in said reservoir or by adding hydrogen peroxide to said medium.

19. A method according to claim 1, wherein said air supply means further removes undesirable vapor emissions from said mass.

* * * * *